United States Patent
Pourahmadi et al.

(10) Patent No.: US 8,842,715 B2
(45) Date of Patent: Sep. 23, 2014

(54) SYSTEM AND METHOD FOR INCREASING MAXIMUM PAYLOAD SIZE

(71) Applicant: Research In Motion Limited, Waterloo (CA)

(72) Inventors: Vahid Pourahmadi, Ottawa (CA); Yongkang Jia, Ottawa (CA); Masoud Ebrahimi Tazeh Mahalleh, Ottawa (CA); Shiwei Gao, Nepean (CA)

(73) Assignee: BlackBerry Limited, Waterloo, AE (US)

( * ) Notice: Subject to any disclaimer, the term of this patent is extended or adjusted under 35 U.S.C. 154(b) by 0 days.

(21) Appl. No.: 13/858,659

(22) Filed: Apr. 8, 2013

(65) Prior Publication Data

US 2013/0223482 A1    Aug. 29, 2013

Related U.S. Application Data

(63) Continuation of application No. PCT/CA2011/000737, filed on Jun. 27, 2011.

(51) Int. Cl.
*H04B 1/00* (2006.01)
*H04J 13/00* (2011.01)
*H04J 13/18* (2011.01)
*H04B 1/707* (2011.01)
*H04L 27/26* (2006.01)
*H04L 27/20* (2006.01)

(52) U.S. Cl.
CPC ............ *H04B 1/707* (2013.01); *H04J 13/0003* (2013.01); *H04J 13/18* (2013.01); *H04L 27/2601* (2013.01); *H04L 27/20* (2013.01)
USPC .......................................... 375/146; 375/140

(58) Field of Classification Search
USPC .......................................... 375/146, 140, 130
See application file for complete search history.

(56) References Cited

U.S. PATENT DOCUMENTS

| | | | |
|---|---|---|---|
| 2010/0098012 A1 | 4/2010 | Bala et al. | |
| 2011/0064115 A1* | 3/2011 | Xu et al. | 375/130 |
| 2011/0268102 A1* | 11/2011 | Zhu et al. | 370/345 |
| 2012/0327864 A1* | 12/2012 | Gazit | 370/329 |

OTHER PUBLICATIONS

Cho, B., "3GPP R8 LTE Overview", Intel Corporation. Dec. 10, 2010.
Wu, M. et al., "Performance Analysis of Physical Downlink and Uplink Channels in TD-LTE System", 2010 12th IEEE International Conference on Communication Technology (ICCT). Nov. 14, 2010.
International Search Report on International Application No. PCT/CA2011/000737, issued Mar. 7, 2012.

* cited by examiner

*Primary Examiner* — Chieh M Fan
*Assistant Examiner* — Brian J Stevens
(74) *Attorney, Agent, or Firm* — Moffat & Co.

(57) ABSTRACT

A method and apparatus for increasing, at a transmitter, a payload size of a communication channel having orthogonal groups, the method referencing a base orthogonal sequence set comprising orthogonal sequences that are mutually orthogonal, the orthogonal sequence set having subsets that are sub-block orthogonal with a length of four; and selecting a spreading sequence set from a plurality of spreading sequence sets, each of the plurality of spreading sequence sets comprising an orthogonal sequence set subset combined with an imaginary orthogonal sequence set subset, wherein the selecting increases payload size.

14 Claims, 15 Drawing Sheets

FIG. 10

SYSTEM AND METHOD FOR INCREASING MAXIMUM PAYLOAD SIZE

FIELD OF THE DISCLOSURE

The present disclosure relates to the physical hybrid automatic repeat request indicator channel (PHICH) and in particular relates to the payload size of a PHICH group.

BACKGROUND

A physical hybrid automatic repeat request indicator channel is a downlink feedback channel in long term evolution (LTE) and is used by an Evolved Node B (eNB) to transmit acknowledgement and negative acknowledgement (ACK/NACK) messages to user equipments (UEs) regarding whether previously scheduled physical uplink shared channel (PUSCH) data has been successfully received by the eNB. In the current implementation of PHICH, multiple PHICH groups may be configured and each PHICH group consists of eight PHICHs. PHICHs in the same PHICH group share the same time-frequency resources. Three resource element groups (REGs) are allocated for one PHICH group. The REGs are distributed throughout the entire bandwidth to achieve frequency diversity. Each REG consists of four resource elements (REs) that are transmitted over adjacent sub-carriers. Each PHICH is assigned with one of eight orthogonal sequences and different PHICHs in a PHICH group are multiplexed in a code division multiplexing (CDM) manner in each REG. Because the wireless propagation channel is almost flat for symbols inside each REG, the orthogonality among different PHICHs is preserved even after travelling through a wireless channel.

However, due to the orthogonality requirement, a PHICH group is limited to eight bits, or eight PHICHs, since eight orthogonal sequences are defined for PHICH. Further, in current implementations, the sequences are orthogonal only in the real domain and thus high order modulations such as M-PSK (phase shift keying) or M-QAM (quadrature amplitude modulation) cannot be used to increase the capacity of the PHICH group, where M=2, 4, 8, etc.

If more than eight PHICH bits need to be transmitted, another PHICH group needs to be used, therefore utilizing more radio resources.

BRIEF DESCRIPTION OF THE DRAWINGS

The present disclosure will be better understood with reference to the drawings, in which:

FIG. 10 is a process diagram showing the selection of extra spreading sequences;

DETAILED DESCRIPTION OF THE DRAWINGS

Figure 1:
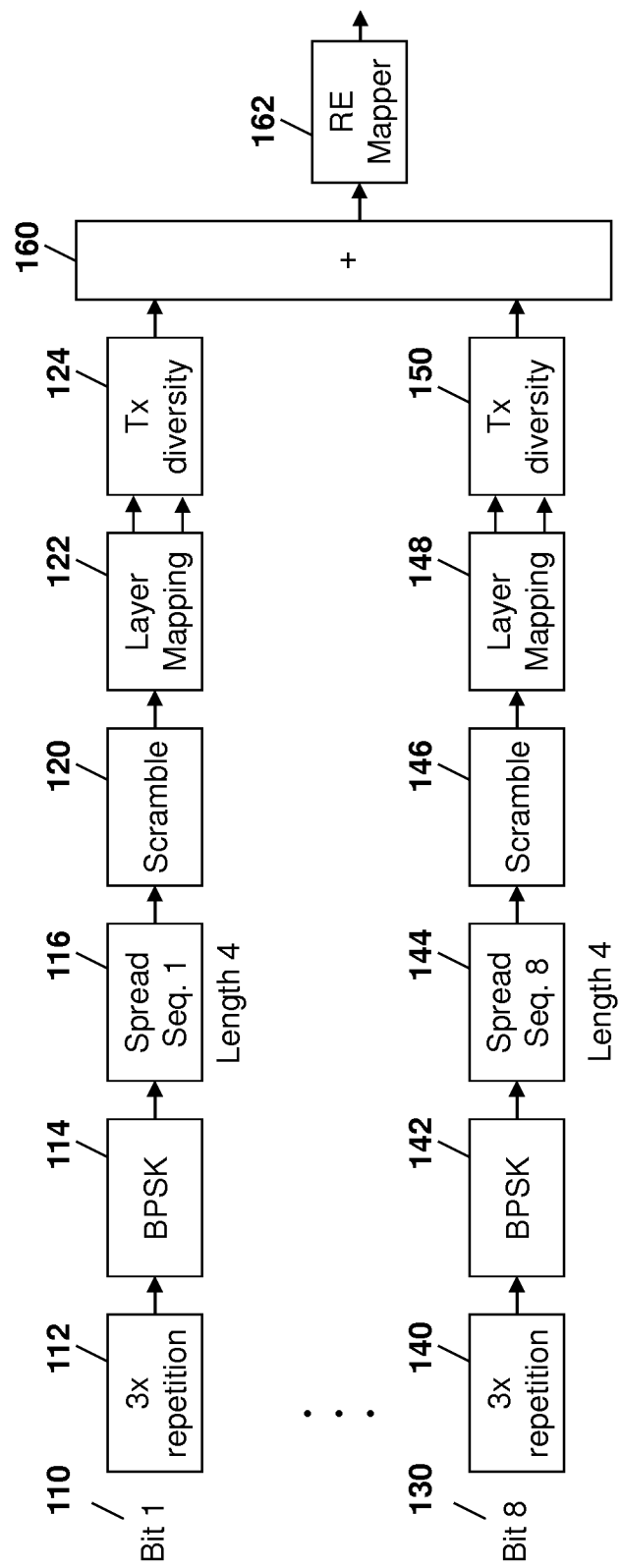
FIG. 1 is a block diagram illustrating the generation of one PHICH group.

The present disclosure provides a method for increasing, at a transmitter, a payload size of a communication channel having orthogonal groups, the method comprising: referencing a base orthogonal sequence set comprising orthogonal sequences that are mutually orthogonal, the orthogonal sequence set having subsets that are sub-block orthogonal with a length of four; and selecting a spreading sequence set from a plurality of spreading sequence sets, each of the plurality of spreading sequence sets comprising an orthogonal sequence set subset combined with an imaginary orthogonal sequence set subset, wherein the selecting increases payload size.

The present disclosure further provides a method for increasing, at a transmitter, payload size of a communication channel having orthogonal groups, the method comprising: referencing a base orthogonal sequence set comprising twelve orthogonal sequences that are mutually orthogonal, the orthogonal sequence set having three subsets that are sub-block orthogonal with a length of four; selecting a spreading sequence based on an orthogonal sequence set subset combined with an imaginary orthogonal sequence set subset; and utilizing at least one extra orthogonal sequence to increase payload size.

The present disclosure further provides a method for increasing, at a transmitter, payload size of a communication channel having orthogonal groups, the method comprising: referencing a base orthogonal sequence set comprising twelve orthogonal sequences that are mutually orthogonal, the orthogonal sequence set having three subsets that are sub-block orthogonal with a length of four; and using a higher order modulation than binary phase shift keying for transmission to increase payload size.

The present disclosure still further provides a transmitting apparatus comprising: a processor; and a communications subsystem, wherein the processor and communications subsystem cooperate to reference a base orthogonal sequence set comprising twelve orthogonal sequences that are mutually orthogonal, the orthogonal sequence set having three subsets that are sub-block orthogonal with a length of four; select a spreading sequence based on an orthogonal sequence set subset combined with an imaginary orthogonal sequence set subset; and utilize at least one extra orthogonal sequence to increase payload size The present disclosure still further provides a transmitting apparatus comprising: a processor; and a communications subsystem, wherein the processor and communications subsystem cooperate to reference a base orthogonal sequence set comprising twelve orthogonal sequences that are mutually orthogonal, the orthogonal sequence set having three subsets that are sub-block orthogonal with a length of four; and use a higher order modulation than binary phase shift keying for transmission to increase payload size.

The present disclosure further provides a method at a receiver for detecting increased payload size of a communication channel having orthogonal groups, the method comprising: receiving a signal; referencing a base orthogonal sequence set comprising orthogonal sequences that are mutually orthogonal, the orthogonal sequence set having subsets that are sub-block orthogonal with a length of four; determining which of a spreading sequence set from a plurality of spreading sequence sets was used for encoding the signal, the plurality of spreading sequence sets comprising an orthogonal sequence set subset combined with an imaginary orthogonal sequence set subset; and adding extra bits to the signal based on the determining.

The present disclosure further provides a receiver apparatus comprising: a processor; and a communications subsystem, wherein the processor and communications subsystem cooperate to receive a signal; referencing a base orthogonal sequence set comprising orthogonal sequences that are mutually orthogonal, the orthogonal sequence set having subsets that are sub-block orthogonal with a length of four; determine which of a spreading sequence set from a plurality of spreading sequence sets was used for encoding the signal, the plurality of spreading sequence sets comprising an orthogonal sequence set subset combined with an imaginary orthogonal sequence set subset; and add extra bits to the signal based on the determining.

Under current designs, multiple PHICH groups may be configured in each sub-frame and each PHICH group occupies twelve resource elements (REs) and can carry up to eight bits of information. An RE in LTE is defined as one sub-carrier at an orthogonal frequency division multiplexing (OFDM) symbol.

Reference is now made to FIG. 1, which shows the encoding of one PHICH group. In particular, eight bits are encoded in the same way but utilizing a different spreading sequence.

Thus, first bit 110 is first repeated three times at block 112, after which binary phase shift keying (BPSK) modulation is performed at block 114.

The BPSK modulation of block 114 results in three symbols, each of which is then spread using a first spreading sequence, as shown at block 116. The spreading sequence utilized by block 116 is shown in Table 1 below.

Once the symbols have been spread utilizing a spreading sequence, the output is then scrambled at block 120, passed through layer mapping block 122 and precoded for transmission diversity at block 124.

Similarly, the remaining bits are also repeated, modulated using BPSK, spread using an appropriate spreading sequence, scrambled, layer mapped and precoded. The example of FIG. 1 shows the first bit 110 and the last bit 130. In particular, bit 130 is shown with regard to a three times repetition block 140, a BPSK modulation block 142, a spreading sequence block 144, which shows the spreading sequence utilizing spreading sequence eight, a scrambling block 146, a layer mapping block 148 and a transmission diversity block 150.

The results of the transformation of all of the eight bits are then added at block 160 and mapped to twelve resource elements assigned to the PHICH group at block 162.

Each of the eight bits is associated with a specific spreading sequence, which is orthogonal to the other spreading sequences. In particular, reference is now made to Table 1.

TABLE 1

Orthogonal Sequences for PHICH

| Sequence Index | Orthogonal sequence Normal cyclic prefix |
|---|---|
| 0 | [+1 +1 +1 +1] |
| 1 | [+1 −1 +1 −1] |
| 2 | [+1 +1 −1 −1] |
| 3 | [+1 −1 −1 +1] |
| 4 | [+j +j +j +j] |
| 5 | [+j −j +j −j] |
| 6 | [+j +j −j −j] |
| 7 | [+j −j −j +j] |

From the above, the orthogonal sequence associated with each sequence index is applied to the appropriate bit.

Figure 2:
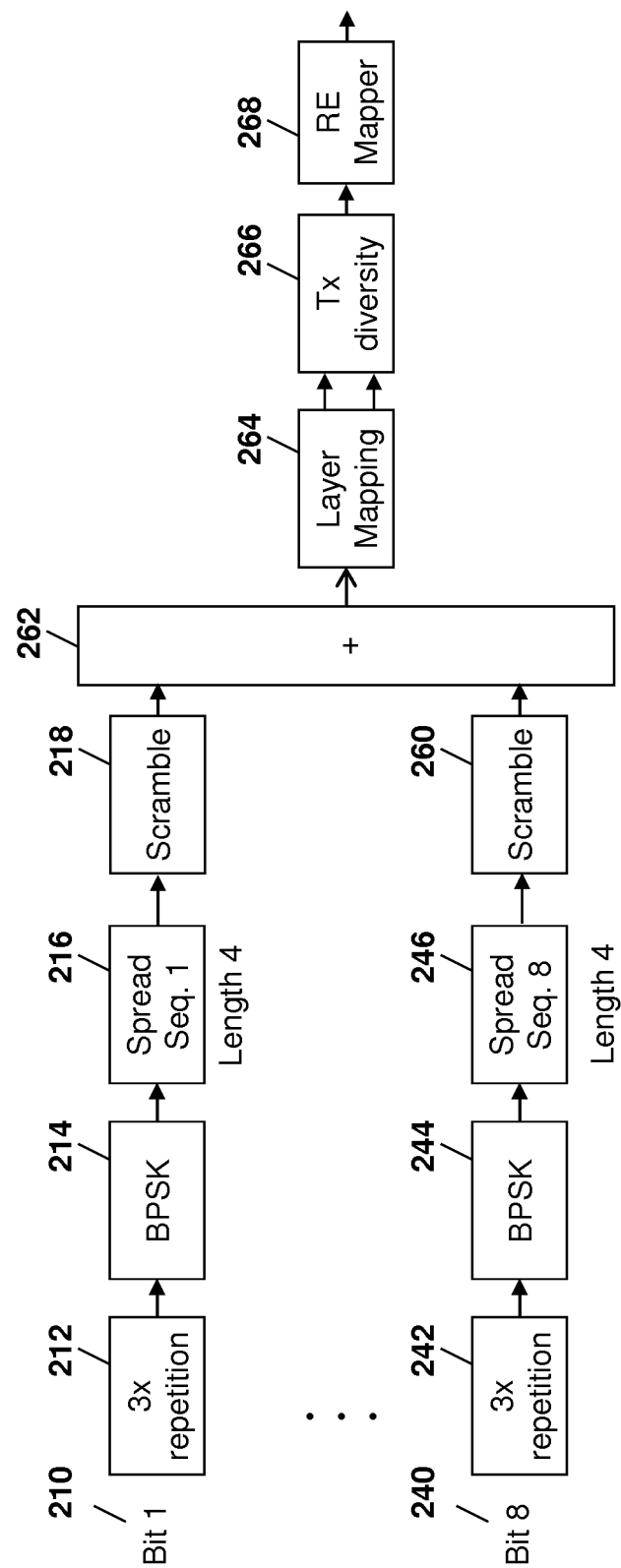
FIG. 2 is a block diagram illustrating an alternative generation of one PHICH group.

Referring to FIG. 2, it is possible to rearrange the embodiment of FIG. 1 as shown with regard to FIG. 2.

In particular, a first bit 210 is three times repeated at block 212, BPSK modulated at block 214 and spread using a spreading sequence for the first bit at block 216, and scrambled with a scramble sequence at block 218.

Similarly, eighth bit 240 is three times repeated at block 242, BPSK modulated at block 244 and spread using a spreading sequence for the eighth bit at block 246, and scrambled with a scramble sequence at block 260.

The results of the scramble sequences for all eight bits are then added at block 262, layer mapped at block 264, precoded for transmission diversity at block 266 and resource element mapped at block 268.

As noted in the third generation partnership project (3GPP), Technical Specification 36.211, "Physical Channels and Modulation", version 9.1.0, the contents of which are incorporated herein by reference, the twelve symbols of one PHICH group are mapped to three resource element groups (REGs). These REGs are then distributed across the whole available bandwidth for transmission of downlink control information. This scheme provides frequency diversity for the PHICH group.

Further, with regard to power control, some UEs may be located at the cell edge and some may be located close to the cell center. To maintain the required decoding performance, PHICH transmit power may need to be boosted for those PHICHs associated with cell edge UEs and decreased for transmission to UEs close to the cell center. Under currently systems, the output power for a PHICH can be changed at the BPSK modulator.

Further, frequency diversity may be achieved by spreading one PHICH group over the whole bandwidth. Thus, the three REGs for one PHICH group are distributed over the whole bandwidth. On the other hand, the four REs inside each REG are transmitted over adjacent sub-carriers. This scheme provides an effectively flat channel for the symbols inside one REG and orthogonality is preserved.

For example, to explain the requirement of the flat channel within a resource element group, an example is provided with one PHICH group in the case of a single transmitter antenna at an eNB. Since the PHICH group is a code division multiplexing of PHICH bits, denoting the ACK/NACK bit of the ith PHICH by $x_i$, the first four symbols of the PHICH group can be determined as $S_1=B_1x$, where x is the matrix defined as:

$$x = \begin{bmatrix} x_1 \\ x_2 \\ \vdots \\ x_8 \end{bmatrix} \quad [1]$$

and $S_1$ is the matrix defined as:

$$S_1 = \begin{bmatrix} S_1 \\ S_2 \\ S_2 \\ S_4 \end{bmatrix} \quad [2]$$

And $B_1$ is the matrix of orthogonal sequences in Table 1 above and each column of $B_1$ is associated with each of the PHICH bits. In other words, $B_1$ is the matrix as shown below.

$$B_1 = \begin{bmatrix} +1 & +1 & +1 & +1 & +j & +j & +j & +j \\ +1 & -1 & +1 & -1 & -j & +j & +j & -j \\ +1 & +1 & -1 & -1 & +j & +j & -j & -j \\ +1 & -1 & -1 & +1 & +j & -j & -j & +j \end{bmatrix} \quad [3]$$

The received signal at the UE is a channel-weighted version of the transmitted symbol $S_1$, plus some additive noise. Thus, the received signal $y_1$ is equal to $H_1 S_1 + n = H_1 B_1 x + n$, where $H_1$ is a matrix representing the effective channel gains on each transmitted symbol. As an example, for a single input single output system the channel matrix is a diagonal matrix defined as:

$$H_1 = \begin{bmatrix} h_1 & 0 & 0 & 0 \\ 0 & h_2 & 0 & 0 \\ 0 & 0 & h_3 & 0 \\ 0 & 0 & 0 & h_4 \end{bmatrix} \quad [4]$$

Assuming code-domain orthogonality for the transmitted signal, a UE can simply estimate its own transmitted symbol, which is a BPSK symbol in current LTE design, by correlating the received signal $y_1$ with its corresponding spreading sequence.

To keep the orthogonality between the sequences at the UE side, the columns of matrix $H_1 B_1$ should be orthogonal. This requires that all $h_i$ (where i=1 to 4), be the same, which means a flat channel within one resource element group. Otherwise, inter-UE interference will occur.

Also, the orthogonality of the column space of matrix $H_1 B_1$ is in the sense of the real part of the complex correlation value of the sequences for the BPSK signal.

The above limits the bits that can be transmitted in one PHICH group to eight for three reasons. A first is that there is no unused orthogonal code that can be used for data transmission. As seen in Table 1, there are already eight sequences with the length of four.

A second reason for the limitation is that the sequences are orthogonal only in the real domain, which means that the higher order modulations such as M-PSK or M-QAM cannot be used to increase the capacity of the PHICH group.

A third reason that the number of symbols is limited to eight is that if M-PSK or M-QAM modulation was to be used, the PHICH could only use the first four sequences from Table 1, which are orthogonal in the complex value domain.

Mathematical Model

In current LTE design, if the repetition coding is combined with spreading, the equivalent spreading sequence of length 12 is obtained, as is shown below with regard to Table 2.

TABLE 2

Equivalent 12 Bit Spreading Sequences

| C1 | 1 | 1 | 1 | 1 | 1 | 1 | 1 | 1 | 1 | 1 | 1 | 1 |
|---|---|---|---|---|---|---|---|---|---|---|---|---|
| C2 | 1 | −1 | 1 | −1 | 1 | −1 | 1 | −1 | 1 | −1 | 1 | −1 |
| C3 | 1 | 1 | −1 | −1 | 1 | 1 | −1 | −1 | 1 | 1 | −1 | −1 |
| C4 | 1 | −1 | −1 | 1 | 1 | −1 | −1 | 1 | 1 | −1 | −1 | 1 |
| C5 | j | j | j | j | j | j | j | j | j | j | j | j |
| C6 | j | −j | j | −j | j | −j | j | −j | j | −j | j | −j |
| C7 | j | j | −j | −j | j | j | −j | −j | j | j | −j | −j |
| C8 | j | −j | −j | j | j | −j | −j | j | j | −j | −j | j |

In Table 2, the spreading sequences are repetitions of the orthogonal codes of Table 1 and the equivalent spreading matrix is shown as:

$$B = \begin{bmatrix} B_1 \\ B_1 \\ B_1 \end{bmatrix} \quad [5]$$

Further, the received signal is provided as:

$$y = HBx + n = Gx + n \quad [6]$$

where:

$$H = \begin{bmatrix} H_1 & 0 & 0 \\ 0 & H_2 & 0 \\ 0 & 0 & H_3 \end{bmatrix} \quad [7]$$

and G=HB.

PHICH Receiver

Each user can decode its own data by first correlating the received signal by its associated orthogonal sequence in each resource element group and then use maximal ratio combining (MRC) to decode the three times repetition code across the three resource element groups.

To enhance the above scheme, it is noted that each user knows all the spreading sequence and since the number of spreading sequences is not large, it is possible to have a minimum mean square error (MMSE) receiver to jointly estimate all eight modulated symbols at each UE.

Having B and the estimation of channel gains ($\hat{H}$), we can use the MMSE receiver matrix:

$$F = \left( \hat{G} \hat{G}^H + \frac{\sigma_n^2}{E_s} 1 \right)^{-1} \hat{G} \quad [8]$$

Where $E_s$ is the energy of the transmitted symbol and $\hat{G} = \hat{H}B$. We then have the estimation of the symbols as:

$$\hat{x} = F^H y = F^H Gx + F^H n \quad [9]$$

As shown above with regard to FIG. 2, instead of separate coding and spreading, we can assume that PHICH bits are spread using orthogonal sequences of length 12 represented in a matrix. In order to increase PHICH payload size, one option is not to have separate coding and spreading steps in the design of the PHICH group, the coding and spreading steps can be combined in one module, as shown below. This provides freedom to increase payload size by a required degree.

Length 12 Orthogonal Codes

With regard to Table 2 above, while each row is orthogonal to each other, the table is also sub-block orthogonal. In other words, if the table is partitioned into three sub-blocks with 4 elements in a row, the resulting sequences within each sub-block are orthogonal to each other in the real domain. Further, symbols of one resource element group experience almost similar channels and therefore sequence orthogonality is preserved, although the code is distributed over the whole bandwidth.

Reference is now made to Table 3, which provides a new set of orthogonal sequences.

TABLE 3

12 Bit Orthogonal Sequence Set

| | | | | | | | | | | | | | |
|---|---|---|---|---|---|---|---|---|---|---|---|---|---|
| X1 | C1 | 1 | 1 | 1 | 1 | 1 | 1 | 1 | -1 | 1 | 1 | 1 | 1 |
| | C2 | 1 | 1 | -1 | -1 | -1 | 1 | 1 | 1 | -1 | -1 | 1 | 1 |
| | C3 | 1 | -1 | 1 | -1 | 1 | 1 | -1 | 1 | -1 | 1 | -1 | 1 |
| | C4 | 1 | -1 | -1 | 1 | 1 | -1 | 1 | 1 | 1 | -1 | -1 | 1 |
| X2 | C5 | 1 | 1 | -1 | -1 | 1 | -1 | 1 | 1 | 1 | 1 | 1 | -1 |
| | C6 | 1 | 1 | 1 | 1 | -1 | 1 | -1 | 1 | -1 | -1 | -1 | -1 |
| | C7 | 1 | -1 | -1 | 1 | 1 | 1 | -1 | -1 | -1 | -1 | 1 | -1 |
| | C8 | 1 | -1 | 1 | -1 | -1 | -1 | -1 | -1 | 1 | -1 | 1 | 1 |
| X3 | C9 | -1 | 1 | -1 | -1 | 1 | 1 | -1 | -1 | 1 | -1 | -1 | 1 |
| | C10 | 1 | 1 | 1 | -1 | 1 | -1 | 1 | -1 | -1 | -1 | -1 | -1 |
| | C11 | 1 | -1 | -1 | -1 | -1 | 1 | 1 | -1 | 1 | 1 | -1 | 1 |
| | C12 | 1 | 1 | -1 | 1 | -1 | -1 | -1 | -1 | -1 | 1 | -1 | 1 |

The new sequences are referred to herein as "base orthogonal sequence set" and the embodiment of Table 3 has the following properties.

Sequences C1-C12 are mutually orthogonal to each other in the complex domain. Orthogonality in the complex domain means that if we use these sequences to multiplex 12 complex symbols, they can be completely separated by correlating the received signal with the spreading sequence associated with each symbol. Thus, the number of PHICH symbols in one group can be increased to more than eight and the modulation scheme is not limited to BPSK transmission.

The base orthogonal sequence set has three subsets, namely $X_1$, $X_2$ and $X_3$. Each subset has four orthogonal sequences. The four orthogonal sequences in each subset are also orthogonal in sub-blocks of length 4 in the complex domain. This property reduces the effect of different channel gains over different REGs.

The spreading sequence of Table 3 differs from existing techniques for creating 12 orthogonal sequences. For example, Walsh-Hadamard sequences are one of the common techniques to generate orthogonal sequences. The weakness of the technique is that Walsh-Hadamard sequences can only be used to generate sequences with length equal to an integer power of 2. Therefore they cannot use them to generate sequences with the length of 12.

Another technique to use is second Paley's construction. This scheme can be used when the sequence length is an integer multiple of 4. However, one drawback of using an orthogonal sequence using Paley's construction is the length of the orthogonal sequence is now 12 instead of 4. Therefore, the channel variations across resource element groups have more destructive effects on the orthogonality of the sequences compared to the prior art. This effect becomes more significant as different resource element groups are distributed in the whole available bandwidth in a frequency selective channel.

Utilizing the spreading sequences of Table 3, if a solution is required with a set of 8 spreading sequences that are sub-block orthogonal in a real domain, 4 sequences can be selected from the subset $X_m$, where m is 1, 2 or 3. The other four sequences may come from a subset $X_n$, where n is 1, 2 and 3, multiplied by the complex j. Utilizing this technique, there are a total of nine possible ways to select 8 spreading sequences which remain sub-block orthogonal in the real domain as well. This is illustrated below with regard to Table 4.

TABLE 4

Possible Selection Of Spreading Sequence

| | | |
|---|---|---|
| {X1\|jX1} | {X2\|jX1} | {X3\|jX1} |
| {X1\|jX2} | {X2\|jX2} | {X3\|jX2} |
| {X1\|jX3} | {X2\|jX3} | {X3\|jX3} |

The new spreading sequences do not affect the frequency diversity and PHICH power control mechanisms and therefore these remain unchanged compared to the original LTE release 8 schemes.

Figure 3:
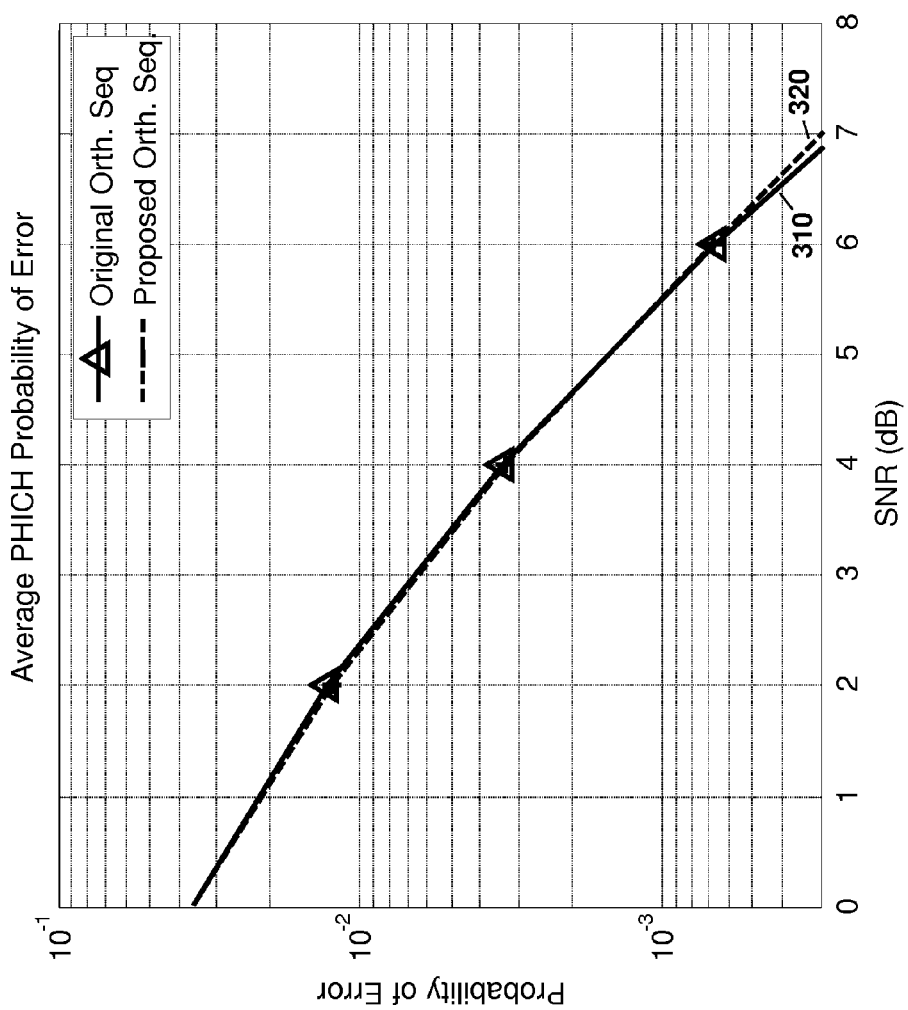
FIG. 3 is a plot comparing performance of current spreading sequences with performance of a new spreading sequence.

Reference is now made to FIG. 3, which provides a graph of simulation results for the proposed orthogonal sequence when compared with the currently used PHICH spreading sequences. In the simulation, the $X_1|jX_2$ spreading sequence set is used in the example for the PHICH data transmission.

As seen in FIG. 3, the performance indicates the signal to noise ratio on the X axis and the probability of error on the Y axis and the performance plot 310 for the currently used orthogonal sequence is compared with the performance plot 320 utilizing the spreading sequence of Table 3.

From FIG. 3, the performance of the new spreading sequence is practically identical to that of the original spreading sequence when 8 BPKS symbols are transmitted.

Transmission of Extra PHICH Bits

Utilizing the spreading sequence of Table 3 above, various approaches may be used to increase the payload size of one PHICH group.

Spreading Sequence Set Selection Approach

In accordance with Table 4 above, if the number of orthogonal sequences is kept to 8 and BPSK is used for modulation, there are nine sets of 8 orthogonal spreading sequences which are sub-block orthogonal in the real domain. Based on Table 4, more than 8 bits are capable of being transmitted. More precisely, 8 bits can be multiplexed by the 8 orthogonal sequences of one of the spreading sequence sets. The extra bits can be used to select which one of the spreading sequence sets is actually used for construction of the PHICH group. The information of these extra bits is, in fact, carried in the spreading sequence set that is selected.

Further, if two spreading sequence sets have less common orthogonal sequences, it would be easier at a receiver to differentiate between the sets. Table 5 shows the number of sequences which are different between different spreading sequence sets.

TABLE 5

Number of Different Sequences between Sets

| | X1/jX1 | X1/jX2 | X1/jX3 | X2/jX1 | X2/jX2 | X2/jX3 | X3/jX1 | X3/jX2 | X3/jX3 |
|---|---|---|---|---|---|---|---|---|---|
| X1/jX1 | 0 | 4 | 4 | 4 | 8 | 8 | 4 | 8 | 8 |
| X1/jX2 | 4 | 0 | 4 | 8 | 4 | 8 | 8 | 4 | 8 |
| X1/jX3 | 4 | 4 | 0 | 8 | 8 | 4 | 8 | 8 | 4 |
| X2/jX1 | 4 | 8 | 8 | 0 | 4 | 4 | 4 | 8 | 8 |
| X2/jX2 | 8 | 4 | 8 | 4 | 0 | 4 | 8 | 4 | 8 |
| X2/jX3 | 8 | 8 | 4 | 4 | 4 | 0 | 8 | 8 | 4 |
| X3/jX1 | 4 | 8 | 8 | 4 | 8 | 8 | 0 | 4 | 4 |
| X3/jX2 | 8 | 4 | 8 | 8 | 4 | 8 | 4 | 0 | 4 |
| X3/jX3 | 8 | 8 | 4 | 8 | 8 | 4 | 4 | 4 | 0 |

In accordance with one embodiment of the present disclosure, 8+k PHICH bits are being transmitted where k is bigger or equal to 0 and is less than or equal to 3.

The above can be illustrated by way of example. For illustration, reference is made to Table 6, which shows the case of k equal to 2. Thus, a total of ten PHICH bits are transmitted within one PHICH group.

TABLE 6

Candidate Spreading Sequence Sets for k = 2

| | | |
|---|---|---|
| {X1|jX2} | {X2|jX1} | {X3|jX2} |
| | {X2|jX3} | |

To send the two extra bits, we need to have four possible spreading-sequence-sets. To maximize the difference between different spreading sequence sets, based on Table 5 above, the spreading-sequence-sets are chosen, as shown in Table 6, while the remaining values in Table 6 have been blanked out when compared with Table 4 above.

In each transmission, bits $b_9$ and $b_{10}$ are used to select one of the candidate spreading sequence sets. To minimize bit error probability, the number of bits changes between spreading sequence sets that have smaller differences are minimized and reference is made to Table 7.

TABLE 7

Labeling of $b_{10}b_9$

| $b_{10}b_9$ | Spreading Sequence Set |
|---|---|
| 00 | {X1|jX2} |
| 01 | {X2|jX1} |
| 10 | {X3|jX2} |
| 11 | {X2|jX3} |

Thus, the eNB chooses one of the four spreading sequence sets and utilizes it to spread the 8 bits sent on the PHICH.

At the receiver, the receiver tries the various spreading sequence sets and discovers which spreading sequence set was used. Based on the spreading sequence set used, two extra bits can be added to the 8 bits contained in the PHICH group.

Figure 4:
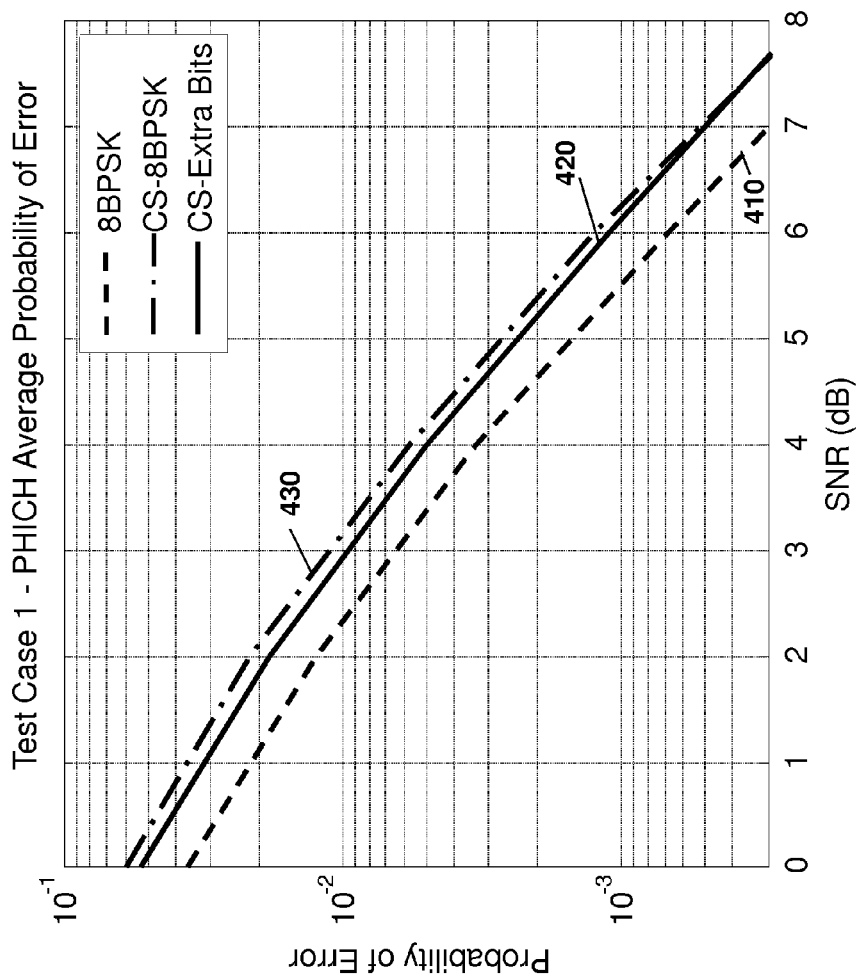
FIG. 4 is a plot comparing performance of current spreading sequences with the performance of using multiple spreading sequences.

Reference is now made to FIG. 4 which shows a plot of the probability of error versus the signal to noise ratio. Plot 410 includes current systems and is used as a benchmark. Plot 420 shows the error probability of PHICH bits which are used for selection of the spreading-sequence-set and plot 430 is the average error probability of the other 8 bits.

Figure 5:
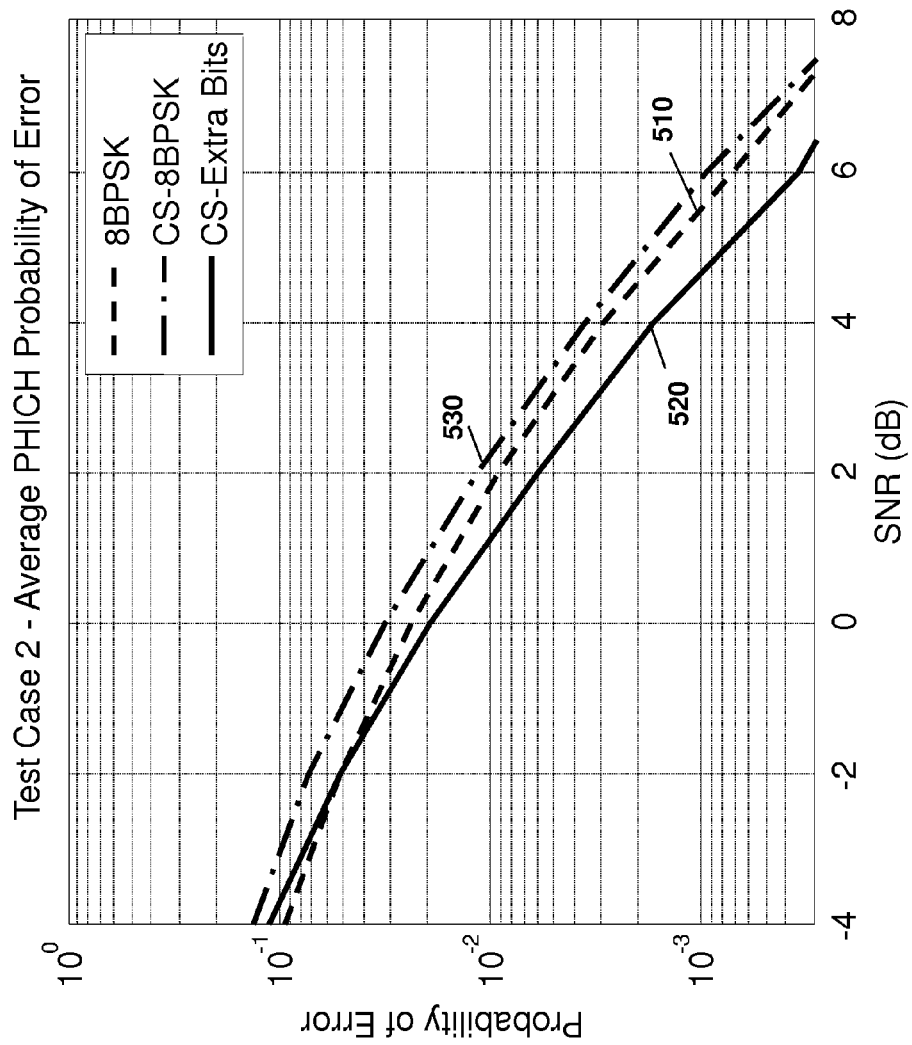
FIG. 5 is a further plot comparing performance of current spreading sequences with the performance of using multiple spreading sequences

Similarly, FIG. 5, shows a plot of a second test case in which plot 510 shows the current PHICH LTE implementation, plot 520 shows the error probability of PHICH bits which are used for selection of the spreading sequence set and plot 530 shows the error probability of the other 8 bits.

As can be seen from FIGS. 4 and 5, although two extra PHICH bits are transmitted for each PHICH group, the performance of the proposed scheme is very close to that of the current LTE PHICH design. Further, the eNB does not use any additional power for transmitting the two extra bits. Therefore, the equivalent power that is used for the present embodiment is 20% less per bit that prior PHICH transmissions (the present system uses the equivalent power to transmit 10 bits versus 8 bits in the LTE PHICH).

Further, the reliability of the bits used for spreading sequence set selection is better than the bits transmitted by the spreading sequences.

Further, the results shown in FIG. 5 along with other simulations (not shown) demonstrate that existence of multiple antennas increases the diversity order and thus increases the probability of accurate spreading sequence set detection and hence improves the overall PHICH error probability.

Similar to the above, instead of k=2, k could equal 1 or 3. If k=1, for spreading sequence sets selection, reference is made to Table 8.

TABLE 8

Candidate Spreading Sequence Sets for k = 1

| | |
|---|---|
| {X1|jX1} | |
| | {X2|jX2} |

As seen from Table 8, only two candidate spreading sequence sets are used for transmission of a total of 9 PHICH bits. The $9^{th}$ bit is selected based on Table 9 below.

TABLE 9

Labeling of $b_9$

| $b_9$ | Spreading Sequence Set |
|---|---|
| 0 | {X1|jX1} |
| 1 | {X2|jX2} |

Thus, based on the above, one extra bit can be transmitted.

Further, for k=3, eight candidate spreading-sequence-sets can be used for a total of three extra bits. As an example, the spreading sequence sets are provided below with regard to Table 10.

TABLE 10

Candidate Spreading Sequence Sets for k = 3

| | | |
|---|---|---|
| {X1|jX1} | {X2|jX1} | {X3|jX1} |
| {X1|jX2} | | {X3|jX2} |
| {X1|jX3} | {X2|jX3} | {X3|jX3} |

The bit sequences for the selection at Table 10 can, for example, be provided for with regard to the labeling at Table 11.

TABLE 11

Labeling of $b_{11}b_{10}b_9$

| $b_{11}b_{10}b_9$ | Spreading Sequence Set |
|---|---|
| 000 | {X1\|jX2} |
| 001 | {X2\|jX1} |
| 010 | {X3\|jX2} |
| 011 | {X2\|jX3} |
| 100 | {X1\|jX1} |
| 101 | {X3\|jX1} |
| 110 | {X1\|jX3} |
| 111 | {X3\|jX3} |

Based on Tables 10 and 11, the three extra bits can be transmitted along with the 8 bits used in the spreading sequence.

The extra bits provided for above with regard to k are not limited to ACK or NACK bits. The bits could be used for any data that the eNB may want to transmit to the UEs.

Based on the above, the eNB uses the predefined candidate spreading sequence sets, which are known both to the UE and the eNB. For example, if two extra bits need to be transmitted, only four spreading sequence sets in Table 4 need to be predefined as candidates for spreading-sequence-sets. Based on the value for the extra k bits, the eNB first selects one of the predefined candidate spreading sequence sets. After the spreading sequence set is selected, the remaining 8 PHICH bits are spread and transmitted based on the orthogonal sequences associated with that spreading sequence set.

In one embodiment, the maximum number of PHICH bits in each group may be semi-statically signaled to the UEs so the UEs know how many and what spreading sequence sets are used by the system.

Further, in one embodiment, if the number of PHICH bits that the eNB wants to transmit in a certain sub-frame is less than or equal to eight, the eNB may use the first spreading sequence set and transmit the bits by multiplexing them into one PHICH group. In this case, there is no set selection and the set selection mechanism only becomes active when the number of PHICH bits is more than eight and the eNB uses the extra bits for selecting appropriate spreading sets.

Figure 6:
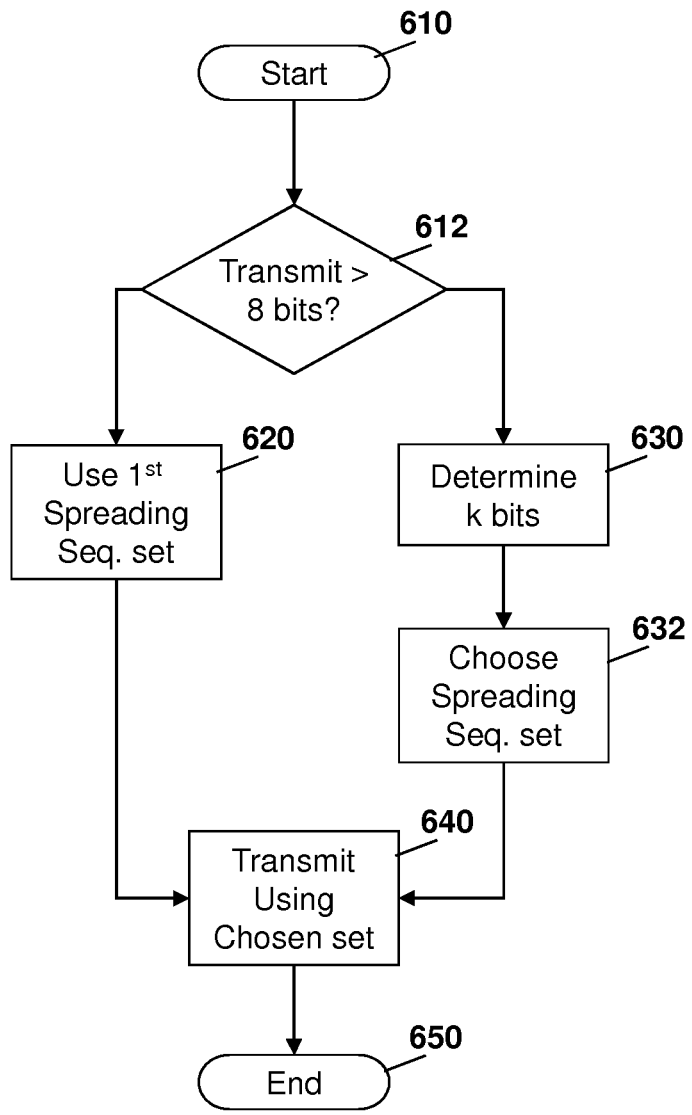
FIG. 6 is process diagram showing the selection of a spreading sequence.

Reference is now made to FIG. 6, which shows a process at the eNB. The process starts at block 610 and proceeds to block 612 in which a decision is made whether the eNB wants to transmit more than 8 bits. If not, the process proceeds to block 620 and chooses the first spreading sequence set.

Conversely, if more than 8 bits need to be transmitted, the process proceeds from block 612 to block 630 in which the eNB determines the "k" bits that need to be transmitted.

From block 630 the process proceeds to block 632 and which the spreading sequence is chosen based on the k extra bits that need to be transmitted. Such determination utilizes Tables 7, 9 or 11, depending on the size of k.

From block 620 or block 632 the process proceeds to block 640 in which the bits are transmitted using the selected spreading sequence. From block 640 the process proceeds to block 650 and ends.

As will be appreciated, the steps of blocks 612 and 620 are optional in one embodiment.

At the receiver, the UE first determines which spreading sequence set has been used for the data transmission. One way is to use energy detection for different hypothesis. Hence the k extra bits can be determined.

Next, the UE uses an MMSE decoder on the assumption for the spreading sequence sets and extracts the remaining PHICH bits. This is shown below with regard to FIG. 7.

Figure 7:
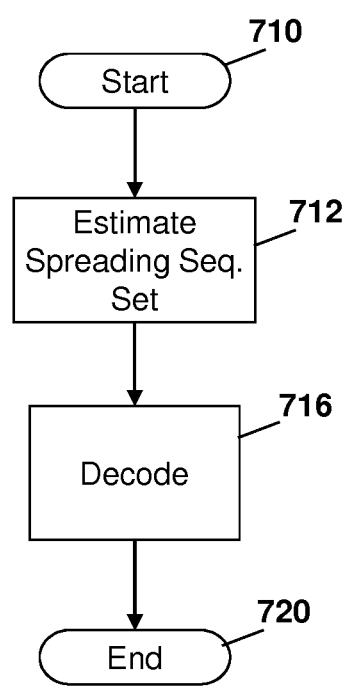
FIG. 7 is process diagram showing decoding of PHICH group.

In FIG. 7 the process starts at block 710 and proceeds to block 712 in which the spreading sequence is estimated.

The process then proceeds to block 714 in which the PHICH bits are decoded using the estimated spreading sequence to complete the bits.

The process then proceeds to block 720 and ends.

In an alternative embodiment, the steps of blocks 712 and 716 can be combined to jointly estimate all transmitted bits.

In one embodiment, it if the extra PHICH bits are used for the transmission of an ACK or NACK, the assignment of the two extra bits to the UE could be dynamically signaled either explicitly or implicitly or both.

The above therefore provides for a spreading sequence set selection approach.

Larger Spreading Sequence Set Approach

In a further alternative embodiment, the payload size of a PHICH group may be increased by using more of the proposed spreading sequences of Table 3. Thus, more than 8 orthogonal sequences are used and BPSK modulation is still used. Using this approach, the number of transmitted PHICH bits may be increased up to 12.

Further, the method allows more than 8 UEs to be multiplexed on the same PHICH group. This may be useful when there are many UEs in a cell.

Table 12 below provides for some spreading sequence sets that can be constructed from the base orthogonal sequence set for different number of PHICH bits.

TABLE 12

Orthoginal Sequence Sets Used for Extra Bits

| # of Bits | Bits 1-8 | Extra Bits | |
|---|---|---|---|
| 8 | {X1\|jX2} | N/A | N/A |
| 9 | {X1\|jX2} | C9 | N/A |
| 10 | {X1\|jX2} | C9 | jC10 |
| 11 | {X1\|jX2} | C9, C10 | jC11 |
| 12 | {X1\|jX2} | C9, C10 | jC11, jC12 |

From Table 12 above, if 9 bits are needed, for example, the spreading set C9 from Table 3 may be used as the $9^{th}$ spreading sequence.

Similarly, if 10 bits are to be transmitted, the extra bits may be spread with C9 and jC10.

If 11 bits are to be transmitted, the extra bits may be spread with C9, C10 and jC11.

Further, is 12 bits are to be transmitted then C9, C10, jC11 and jC12 may be used.

Figure 8:
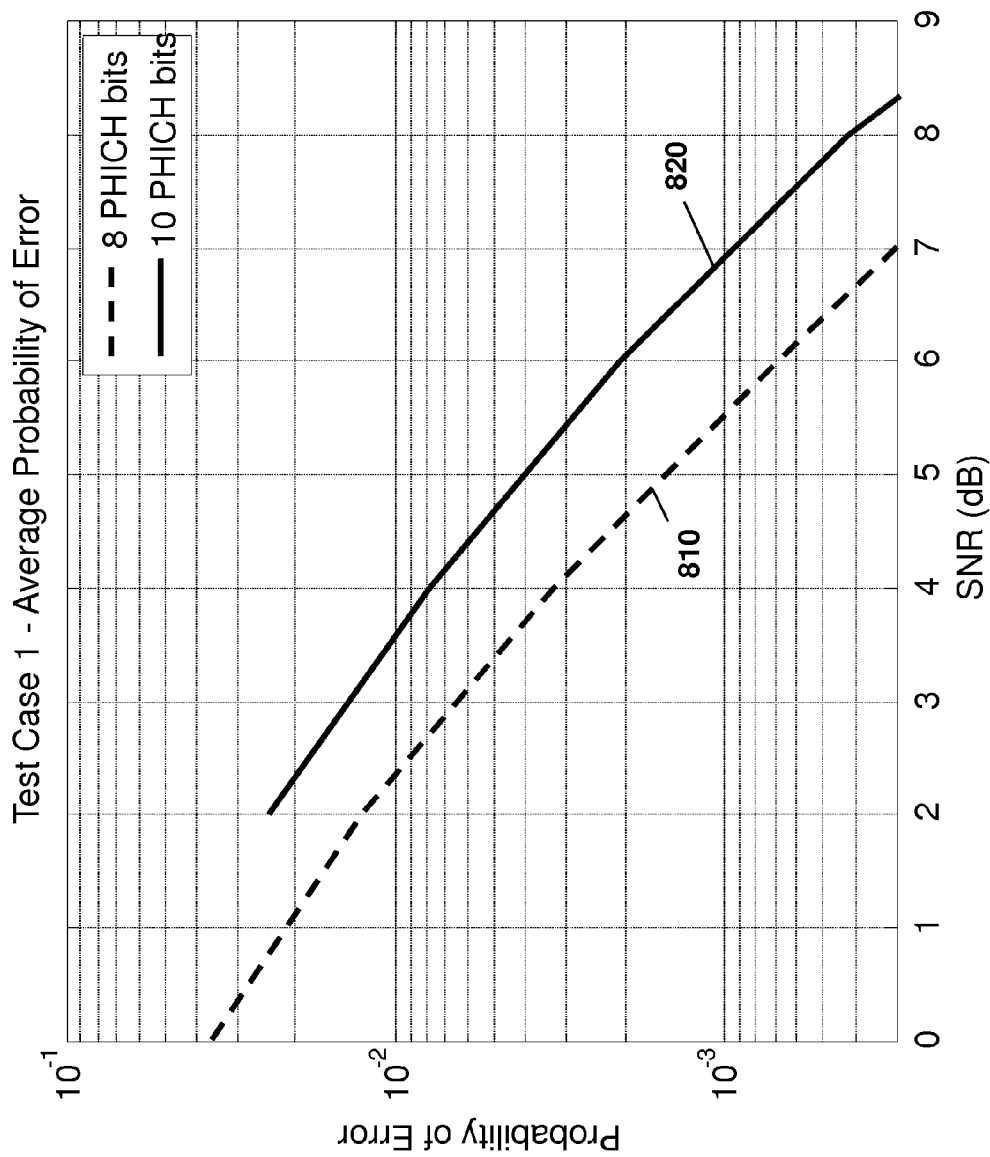
FIG. 8 is a plot showing error probability using extra spreading sequences when compared with using eight spreading sequences.
Figure 9:
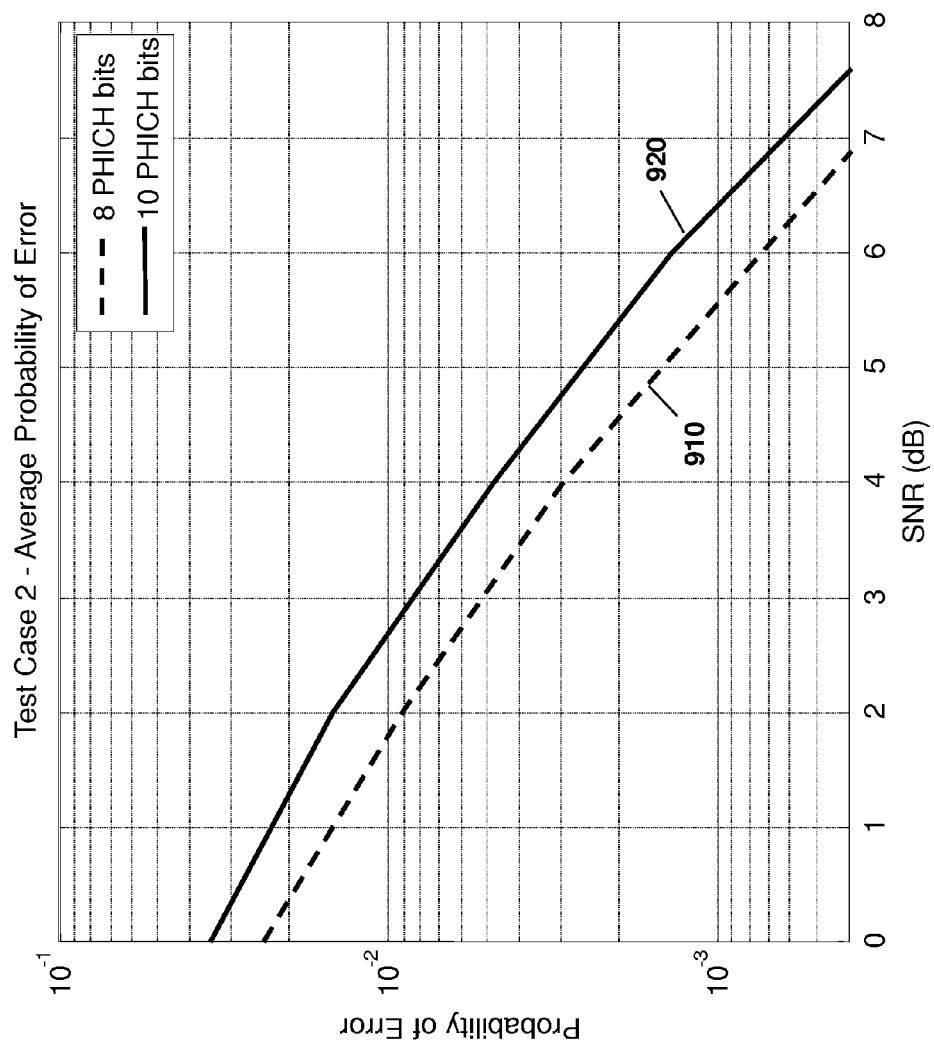
FIG. 9 is a plot of a second test case showing error probability using extra spreading sequences when compared with using eight spreading sequences.

The above spreading sequence set is selected in order to attempt to keep sub-block orthogonality for sequences as much as possible. As examples, FIGS. 8 and 9 present the PHICH performance for a first and second test cases defined in LTE specification, respectively. The plots of FIGS. 8 and 9 show the probability of error versus the signal-to-noise ratio for the sending of 10 PHICH bits compared to the 8 bit transmission case.

Referring to FIG. 8, plot 810 shows the current PHICH transmission for 8 BPSK. Plot 820 shows the sending of 10 bits using the extra bits from Table 12.

Similarly, in a second test case shown in FIG. 9, plot 910 shows a current implementation and plot 920 shows the probability of error versus the signal-to-noise ratio for 8 bits using the embodiment of Table 12.

As seen in FIGS. 8 and 9, the power used for the PHICH bits transmitted for the current implementations for 8 bits and for the embodiment showing 10 bits are equal. Roughly 1 dB less power is allocated for each bit in the 10 PHICH bits transmission case compared to the 8 bit transmission case. This results in an approximately 1 dB shift of the curve for the 10 bit transmission case.

From the above, when more than 8 spreading sequences in one PHICH group are used, it is not possible to keep the sub-block orthogonality property between all sequences. This results in slightly more performance loss of proposed embodiments compared with the current embodiment. Further, the performance for the extra bits that are added to transmit is not as good as the bits that currently exist. The reason is that the effective interference due to non-sub-block orthogonal sequences on the extra bits is different from the effective interference over the spreading sequences in the $X_1$ and $X_2$ subsets. For instance, in the case of 10 PHICH bits, the spreading sequence C9 experiences interference from all sequences in the subset $X_1$, while each sequence in $X_1$ only receives interference from C9.

Two possible solutions to this are to assign more power to the extra bits or to circularly assign spreading sequences to each user such that each user on average experiences the same performance.

Figure 10:
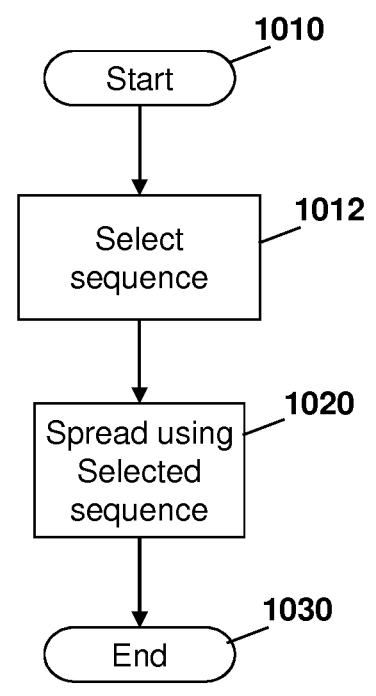

The approach from a transmitter side for a larger spreading sequence set approach is provided for with regard to FIG. 10. The process of FIG. 10 starts at block 1010 and proceeds to block 1012 in which an orthogonal sequence for extra bits is selected.

The process then proceeds to block 1020 in which the selected orthogonal sequence is utilized for spreading the extra bit.

The process then proceeds to block 1030 and ends.

Higher Order Modulation Approach

In a third embodiment, a further way to increase the bits in a PHICH group is to use higher order modulation. Thus, to further increase the payload size we need to use complex data transmission, where each symbol represents more than one PHICH bit, instead of a BPSK symbol. To this end, spreading sequences are needed that are orthogonal in the complex domain.

The proposed base sequence set of Table 3 above, unlike the sequences currently used for LTE for PHICH transmission, is orthogonal in the complex domain. Thus, if a larger payload size is required, it is possible to use the same spreading sequences and send up to twelve complex symbols.

While other spreading sequences may also be orthogonal in the complex domain for 12 orthogonal sequences, the spreading sequences of Table 3 provide both orthogonality in the complex domain but also maintain sub-block orthogonality in the real domain as well.

For example, instead of 8 BPSK symbols, 8 quadrature phase shift keying (QPSK) symbols may be used. This is equivalent to 16 PHICH bits. The method can, for example, be used when data transmission in the uplink is with rank-2 and each UE has two ACK/NACK bits that need to be transmitted on PHICH.

Further, asymmetric modulation such as asymmetric QPSK, can also be used for PHICH power control.

Figure 11:
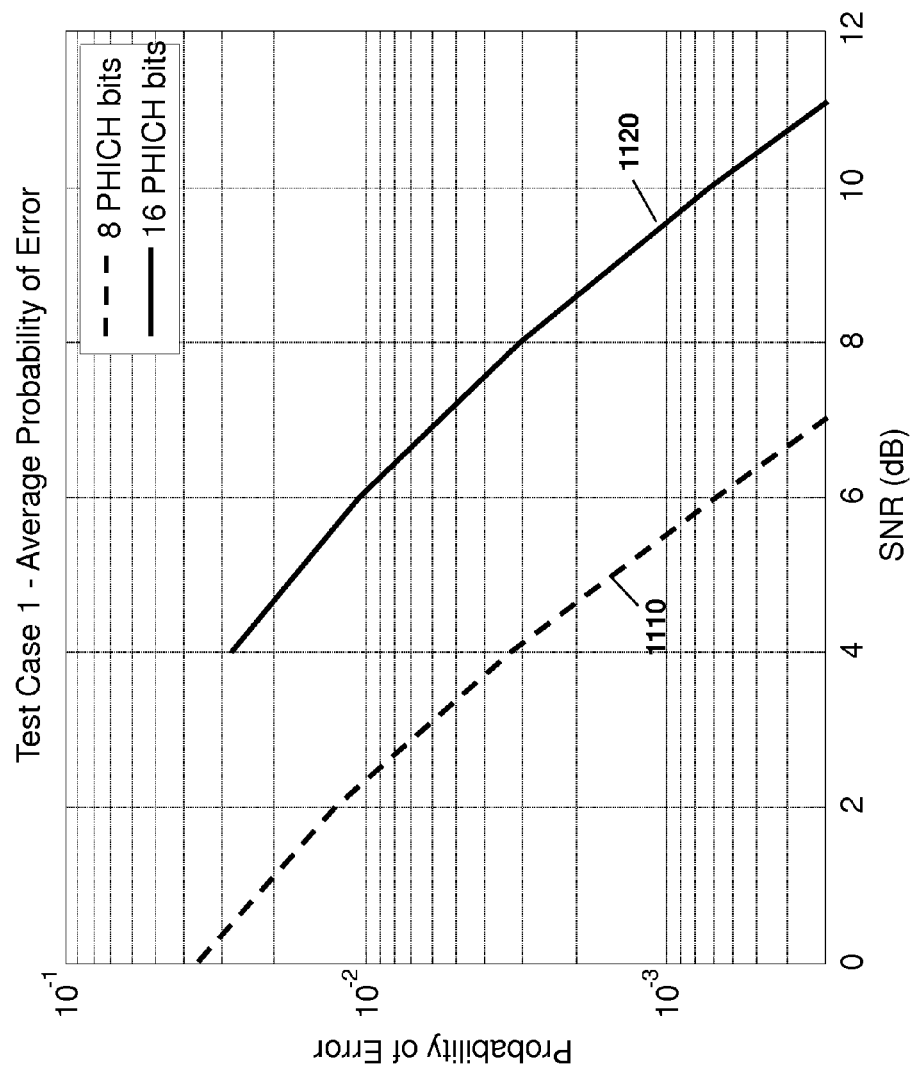
FIG. 11 is a plot showing error probability using higher order modulation when compared with using BPSK.
Figure 12:
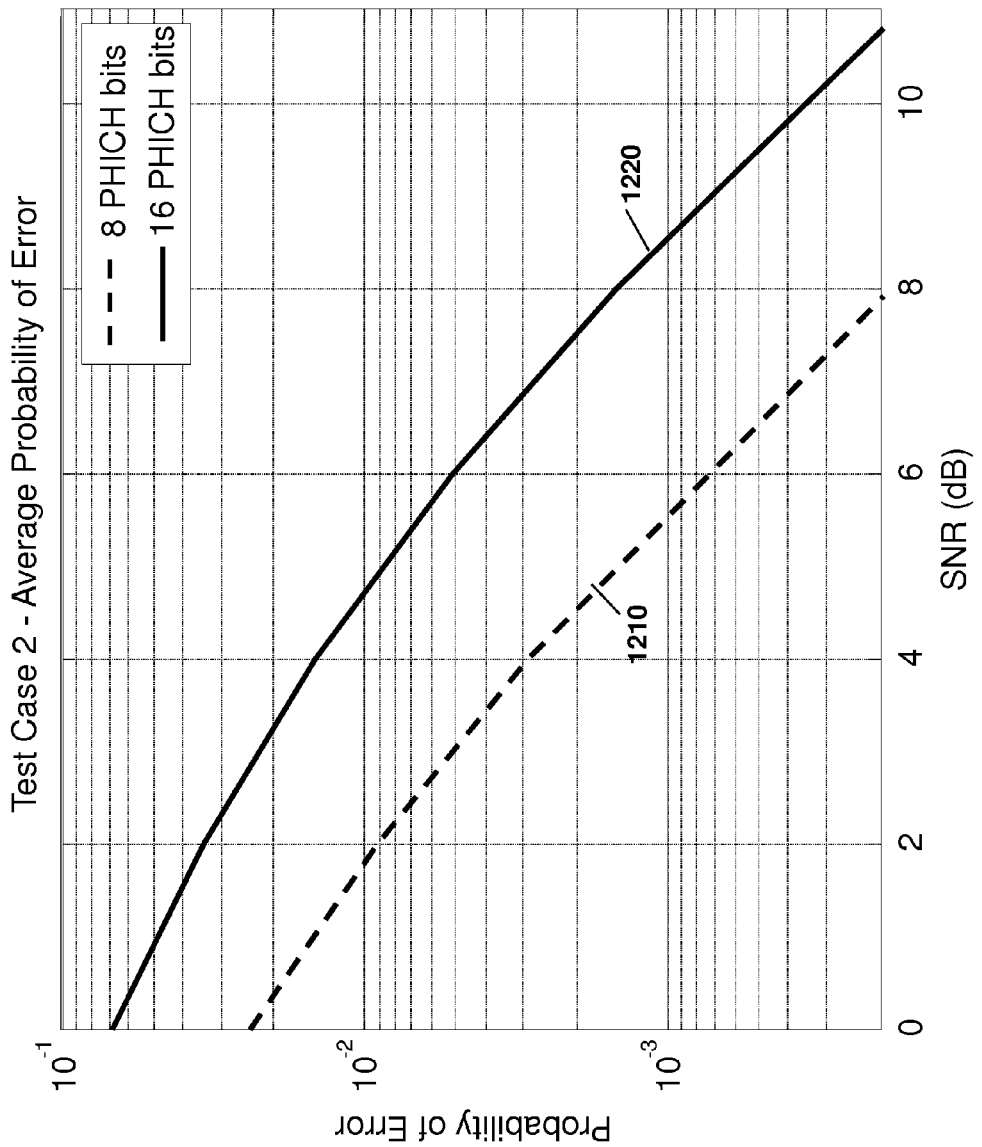
FIG. 12 is a plot of a second test case showing error probability using higher order modulation when compared with using BPSK.

Reference is now made to FIGS. 11 and 12. FIG. 11 shows a plot of the probability of error of the signal-to-noise ratio for a current 8 PHICH bit plot 1110 and a 16 PHICH bit plot 1120. As seen from FIG. 11 there is about a 3.5 dB decrease in performance. However, since the total power per bit is half for 16 PHICH, the decrease in performance may be expected.

Similarly, with regard to FIG. 12, plot 1210 shows a current implementation and plot 1220 shows a 16 PHICH bit implementation. In accordance with the plot of FIG. 12, the difference between the two approaches is approximately 3 dB, which again is an acceptable degradation based on the power level used for the sending of the 16 PHICH bits.

Figure 13:
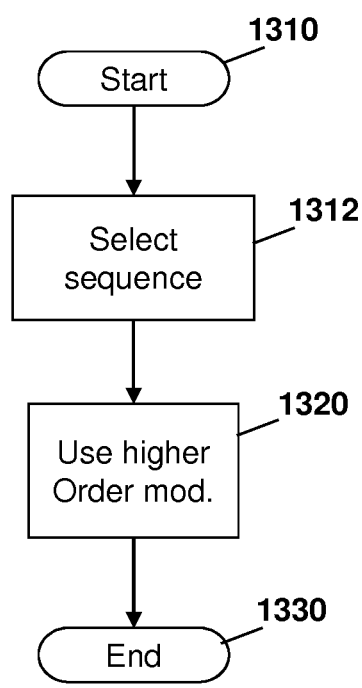
FIG. 13 is a process diagram showing the selection of higher order modulation for transmission.

Referring to FIG. 13, FIG. 13 shows a process at a transmitter at block 1310 and proceeds to block 1312 in which spreading sequences that provide for orthogonality in the complex domain are selected.

The process then proceeds to block 1312 in which higher order modulation is used.

The process then proceeds to block 1330 and ends.

Combined Approach

In a further embodiment, a combination of the above approaches may be utilized. Thus, a combination of any two or all three of: the selection of a spreading sequence set from a plurality of spreading sequence sets, the use of higher order modulation, and the use of a larger size of spreading sequence sets, may be used.

Figure 14:
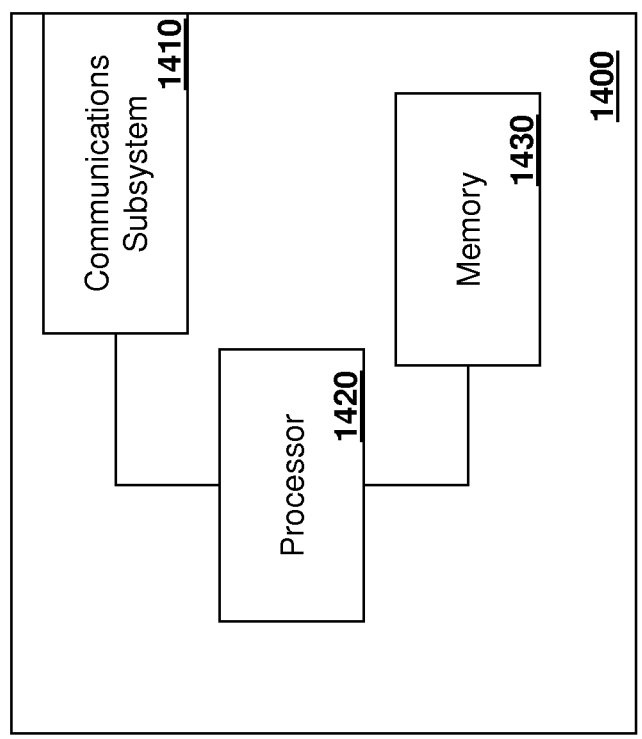
FIG. 14 is simplified block diagram of an exemplary network element.

The above may be implemented on any eNB or network element. One exemplary simplified network element is shown with regard to FIG. 14.

A network element 1400 includes a communications subsystem 1410 capable of communicating with UEs and other network elements.

A processor 1420 is configured to perform the processes and methods described herein, and communicates with communication subsystem 1410 and memory 1430.

In some embodiments, memory may be physically located on a different network element. In other embodiments, a combination of network elements may be used to perform the methods and processes described herein.

The sequences can be received on any mobile device or user equipment. One exemplary user equipment is provided for with regard to FIG. 15.

UE 1500 is generally a two-way wireless communication device having at least voice and data communication capabilities. UE 1500 may have the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1500 is enabled for two-way communication, it can incorporate a communication subsystem 1511, including both a receiver 1512 and a transmitter 1514, as well as associated components such as one or more, embedded or internal, antenna elements 1516 and 1518, local oscillators (LOs) 1513, and a processing module such as a digital signal processor (DSP) 1520. As will be apparent to those skilled in the field of communications, the particular design of the communication subsystem 1511 will be dependent upon the communication network in which the device is intended to operate. For example, UE 1500 may include a communication subsystem 1511 designed to operate within the GPRS network or UMTS network.

Network access requirements will also vary depending upon the type of network 1519. For example, In LTE, UMTS or GPRS networks, network access is associated with a subscriber or user of UE 1500. For example, an LTE UE therefore requires a subscriber identity module (SIM) card in order to operate on an LTE network. In UMTS a USIM or SIM module is required. In CDMA a RUIM card or module is required. These will be referred to as a UIM interface herein. Without a valid UIM interface, a UE may not be fully functional. Local or non-network communication functions, as well as legally required functions (if any) such as emergency calling, may be available, but UE 1500 will be unable to carry out any other functions involving communications over the network 1500.

The UIM interface 1544 is normally similar to a card-slot into which a card can be inserted and ejected like a diskette or PCMCIA card. The UIM card can hold many key configuration 1551, and other information 1553 such as identification, and subscriber related information.

When required network registration or activation procedures have been completed, UE 1500 may send and receive communication signals over the network 1519. Signals received by antenna 1516 through communication network 1519 are input to receiver 1512, which may perform such common receiver functions as signal amplification, frequency down conversion, filtering, channel selection and the like, and in the example system shown in FIG. 15, analog to digital (A/D) conversion. A/D conversion of a received signal allows more complex communication functions such as demodulation and decoding to be performed in the DSP 1520. In a similar manner, signals to be transmitted are processed, including modulation and encoding for example, by DSP 1520 and input to transmitter 1514 for digital to analog conversion, frequency up conversion, filtering, amplification and transmission over the communication network 1519 via antenna 1518. DSP 1520 not only processes communication signals, but also provides for receiver and transmitter control. For example, the gains applied to communication signals in receiver 1512 and transmitter 1514 may be adaptively controlled through automatic gain control algorithms implemented in DSP 1520.

Network 1519 may further communicate with multiple systems, including a server and other elements (not shown). For example, network 1519 may communicate with both an enterprise system and a web client system in order to accommodate various clients with various service levels.

UE 1500 can include a microprocessor 1538 which controls the overall operation of the device. Communication functions, including data communications, are performed through communication subsystem 1511. Microprocessor 1538 also interacts with further device subsystems such as the display 1522, flash memory 1524, random access memory (RAM) 1526, auxiliary input/output (I/O) subsystems 1528, serial port 1530, keyboard 1532, speaker 1534, microphone 1536, a short-range communications subsystem 1540 and any other device subsystems generally designated as 1542.

Figure 15:
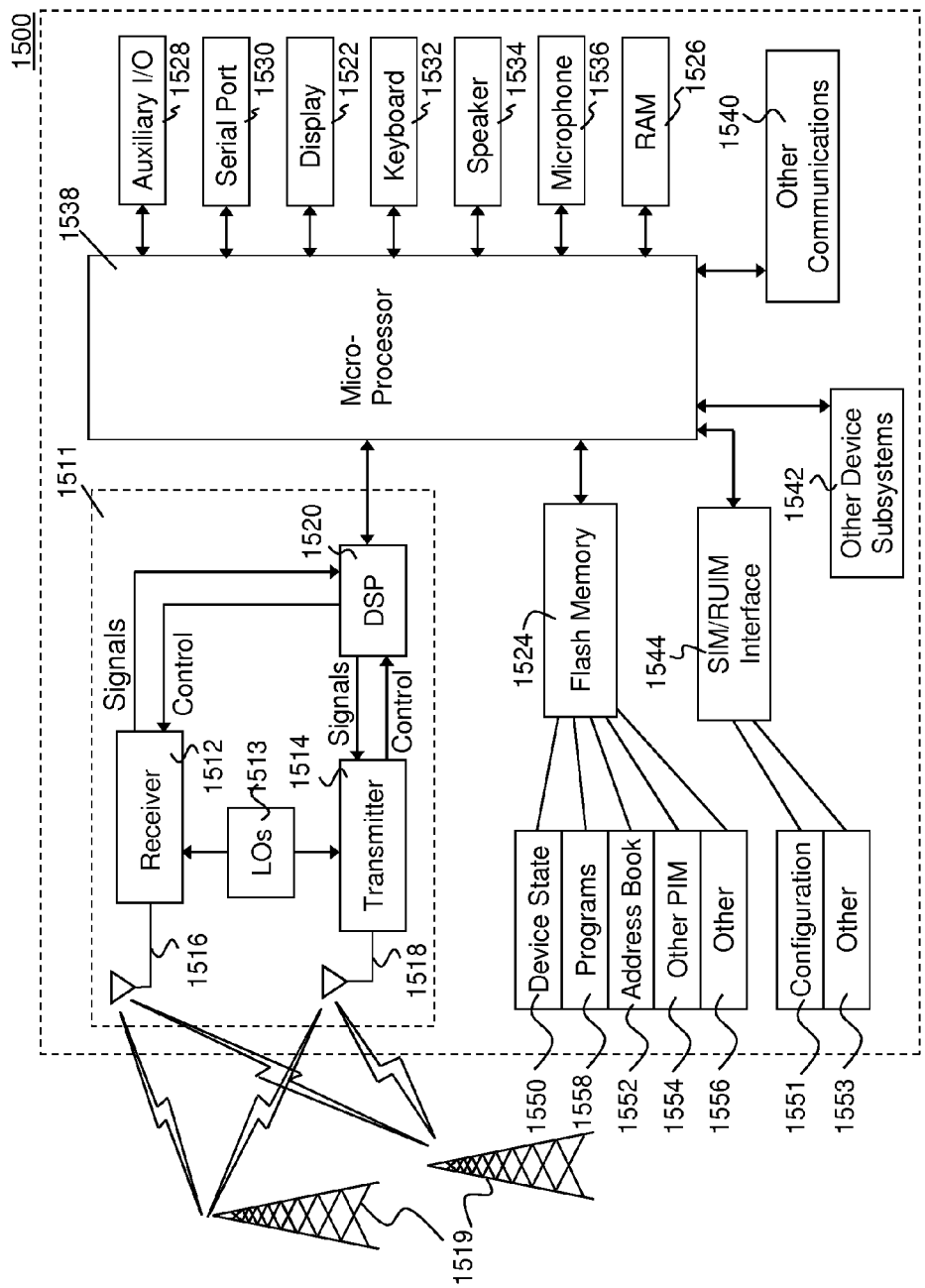
FIG. 15 is a block diagram of an exemplary user equipment.

Some of the subsystems shown in FIG. 15 perform communication-related functions, whereas other subsystems may provide "resident" or on-device functions. Notably, some subsystems, such as keyboard 1532 and display 1522, for example, may be used for both communication-related functions, such as entering a text message for transmission over a communication network, and device-resident functions such as a calculator or task list.

Operating system software used by the microprocessor 1538 may be stored in a persistent store such as flash memory 1524, which may instead be a read-only memory (ROM) or similar storage element (not shown). Those skilled in the art will appreciate that the operating system, specific device applications, or parts thereof, may be temporarily loaded into a volatile memory such as RAM 1526. Received communication signals may also be stored in RAM 1526. Further, a unique identifier is also generally stored in read-only memory.

As shown, flash memory 1524 can be segregated into different areas for both computer programs 1558 and program data storage 1550, 1552, 1554 and 1556. These different storage types indicate that each program can allocate a portion of flash memory 1524 for their own data storage requirements. Microprocessor 1538, in addition to its operating system functions, may enable execution of software applications on the UE. A predetermined set of applications that control basic operations, including data and voice communication applications for example, may be installed on UE 1500 during manufacturing. One software application may be a personal information manager (PIM) application having the ability to organize and manage data items relating to the user of the UE such as, but not limited to, e-mail, calendar events, voice mails, appointments, and task items. Other applications may include multimedia application, social networking applications, instant messaging application, among others.

In a data communication mode, a received signal such as a text message or web page download may be processed by the communication subsystem 1511 and input to the microprocessor 1538, which may further process the received signal for output to the display 1522, or alternatively to an auxiliary I/O device 1528. A user of UE 1500 may also compose data items such as email messages for example, using the keyboard 1532, which in one embodiment is a complete alphanumeric keyboard or telephone-type keypad, in conjunction with the display 1522 and possibly an auxiliary I/O device 1528. Such composed items may then be transmitted over a communication network through the communication subsystem 1511.

For voice communications, overall operation of UE 1500 is similar, except that received signals would typically be output to a speaker 1534 and signals for transmission would be generated by a microphone 1536. Alternative voice or audio I/O subsystems, such as a voice message recording subsystem, may also be implemented on UE 1500. Although voice or audio signal output is generally accomplished primarily through the speaker 1534, display 1522 may also be used to provide an indication of the identity of a calling party, the duration of a voice call, or other voice call related information for example.

Serial port 1530 in FIG. 15 would normally be implemented in a personal digital assistant (PDA)-type UE for which synchronization with a user's desktop computer (not shown) may be desirable. Such a port 1530 would enable a user to set preferences through an external device or software application and would extend the capabilities of UE 1500 by providing for information or software downloads to UE 1500 other than through a wireless communication network. The alternate download path may for example be used to load an encryption key onto the device through a direct and thus reliable and trusted connection to thereby enable secure device communication.

Alternatively, serial port 1530 could be used for other communications, and could include as a universal serial bus (USB) port. An interface is associated with serial port 1530.

Other communications subsystems 1540, such as a short-range communications subsystem, is a further optional component which may provide for communication between UE 1500 and different systems or devices, which need not necessarily be similar devices. For example, the subsystem 1540 may include an infrared device and associated circuits and components, near field communications or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for increasing, at a transmitter, a payload size of a communication channel having orthogonal groups, the method comprising:

referencing, at the transmitter, a base orthogonal sequence set comprising orthogonal sequences that are mutually orthogonal, the orthogonal sequence set having subsets that are sub-block orthogonal with a length of four; and selecting, at the transmitter, a spreading sequence set from a plurality of spreading sequence sets, each of the plurality of spreading sequence sets comprising an orthogonal sequence set subset combined with an imaginary orthogonal sequence set subset, wherein the selecting increases payload size;

wherein the base orthogonal sequence set includes twelve orthogonal sequences and three subsets; and wherein the plurality of spreading sequence sets comprises two spreading sequence sets for an increase of one bit of payload, four spreading sequence sets for an increase of two bits of payload, and eight spreading sequence sets for an increase of three bits of payload.

2. The method of claim 1, wherein the selection of the spreading sequence set from the plurality of spreading sequence sets is mapped to a predefined bit sequence.

3. The method of claim 1, wherein selection of candidate spreading sequence sets from the plurality of spreading sequence sets maximizes differences between spreading sequence sets.

4. The method of claim 1, further comprising using up to twelve spreading sequences for each spreading sequence set for transmission.

5. The method of claim 4, further comprising using a higher order modulation than binary phase shift keying for transmission.

6. The method of claim 1, further comprising using a higher order modulation than binary phase shift keying for transmission.

7. The method of claim 1, wherein the communication channel is a physical hybrid ARQ indicator channel.

8. A method for increasing, at a transmitter, payload size of a communication channel having orthogonal groups, the method comprising:

referencing, at the transmitter, a base orthogonal sequence set comprising twelve orthogonal sequences that are mutually orthogonal, the orthogonal sequence set having three subsets that are sub-block orthogonal with a length of four;

selecting, at the transmitter, a spreading sequence based on an orthogonal sequence set subset combined with an imaginary orthogonal sequence set subset; and utilizing, at the transmitter, at least one extra orthogonal sequence to increase payload size;

wherein the spreading sequence is selected from a plurality of spreading sequence sets and the plurality of spreading sequence sets comprises two spreading sequence sets for an increase of one bit of payload, four spreading sequence sets for an increase of two bits of payload, and eight spreading sequence sets for an increase of three bits of payload.

9. The method of claim 8, further comprising using a higher order modulation than binary phase shift keying for transmission.

10. A method at a receiver for detecting increased payload size of a communication channel having orthogonal groups, the method comprising:

receiving a signal at the receiver;

referencing, at the receiver, a base orthogonal sequence set comprising orthogonal sequences that are mutually orthogonal, the orthogonal sequence set having subsets that are sub-block orthogonal with a length of four;

determining, at the receiver, which of a spreading sequence set from a plurality of spreading sequence sets was used for encoding the signal, the plurality of spreading sequence sets comprising an orthogonal sequence set subset combined with an imaginary orthogonal sequence set subset; and adding, at the receiver, extra bits to the signal based on the determining:

wherein the base orthogonal sequence set includes twelve orthogonal sequences and three subsets; and wherein the plurality of spreading sequence sets comprises two spreading sequence sets for an increase of one bit of payload, four spreading sequence sets for an increase of two bits of payload, and eight spreading sequence sets for an increase of three bits of payload.

11. The method of claim 10, wherein the number of extra bits possible is signaled to the receiver prior to the receiving.

12. The method of claim 10, wherein the determining is based on mapping to a predefined bit sequence.

13. The method of claim 10, further detecting use of extra spreading sequences for transmission.

14. The method of claim 10, further comprising detecting use of a higher order modulation than binary phase shift keying for transmission.

* * * * *